United States Patent
Breakwell

(10) Patent No.: US 8,425,197 B2
(45) Date of Patent: Apr. 23, 2013

(54) MOUNTING ARRANGEMENT

(75) Inventor: Ian S Breakwell, Derby (GB)

(73) Assignee: Rolls-Royce PLC, London (GB)

( * ) Notice: Subject to any disclaimer, the term of this patent is extended or adjusted under 35 U.S.C. 154(b) by 763 days.

(21) Appl. No.: 12/692,231

(22) Filed: Jan. 22, 2010

(65) Prior Publication Data

US 2010/0215507 A1 Aug. 26, 2010

(30) Foreign Application Priority Data

Feb. 24, 2009 (GB) .................................. 0903012.3

(51) Int. Cl.
*B64C 11/14* (2006.01)
(52) U.S. Cl.
USPC ..................................................... 416/245 R
(58) Field of Classification Search ............. 416/245 R, 416/245 A, 244 A, 244 B, 244 R
See application file for complete search history.

(56) References Cited

U.S. PATENT DOCUMENTS 2,371,801 A * 3/1945 Chester et al. ............ 416/245 R
5,149,251 A 9/1992 Scanlon et al.

FOREIGN PATENT DOCUMENTS

GB 2 363 170 A 12/2001

OTHER PUBLICATIONS

May 26, 2009 Search Report issued in British Patent Application No. 0903012.3.

* cited by examiner

*Primary Examiner* — Richard Edgar
(74) *Attorney, Agent, or Firm* — Oliff & Berridge, PLC

(57) ABSTRACT

The invention provides an arrangement for mounting a nose cone 32 on a gas turbine engine. The nose cone 32 has an inwardly tapering flange 64 which defines an inclined contact surface 68. A nose cone support ring 36, mounted in use to a flange 38 on the front of the fan disc 34, has an outer rim 42. An inwardly extending part 50 of the support ring 36 defines an inclined contact surface 54. A plurality of spaced radial openings 44 are provided through the rim 42 each having a countersunk opening 46. A fastening arrangement 70, associated in use with each opening 44, comprises a bolt 72 with a countersunk head. A Vee block 76 locates on each bolt 72, with a mounting nut 78 below it. In use, the nose cone 32 is brought up against the support ring 36. Appropriate rotation of the bolts 72 will cause the nuts 78 and hence Vee blocks 76 to move radially outwardly. Engagement of the inclined contact surfaces 54 and 68 with the contact faces 80 on the Vee blocks 76 urges the nose cone 32 rearwardly as the bolts 72 are tightened, thereby mounting the nose cone 32 on the fan disc 34.

15 Claims, 5 Drawing Sheets

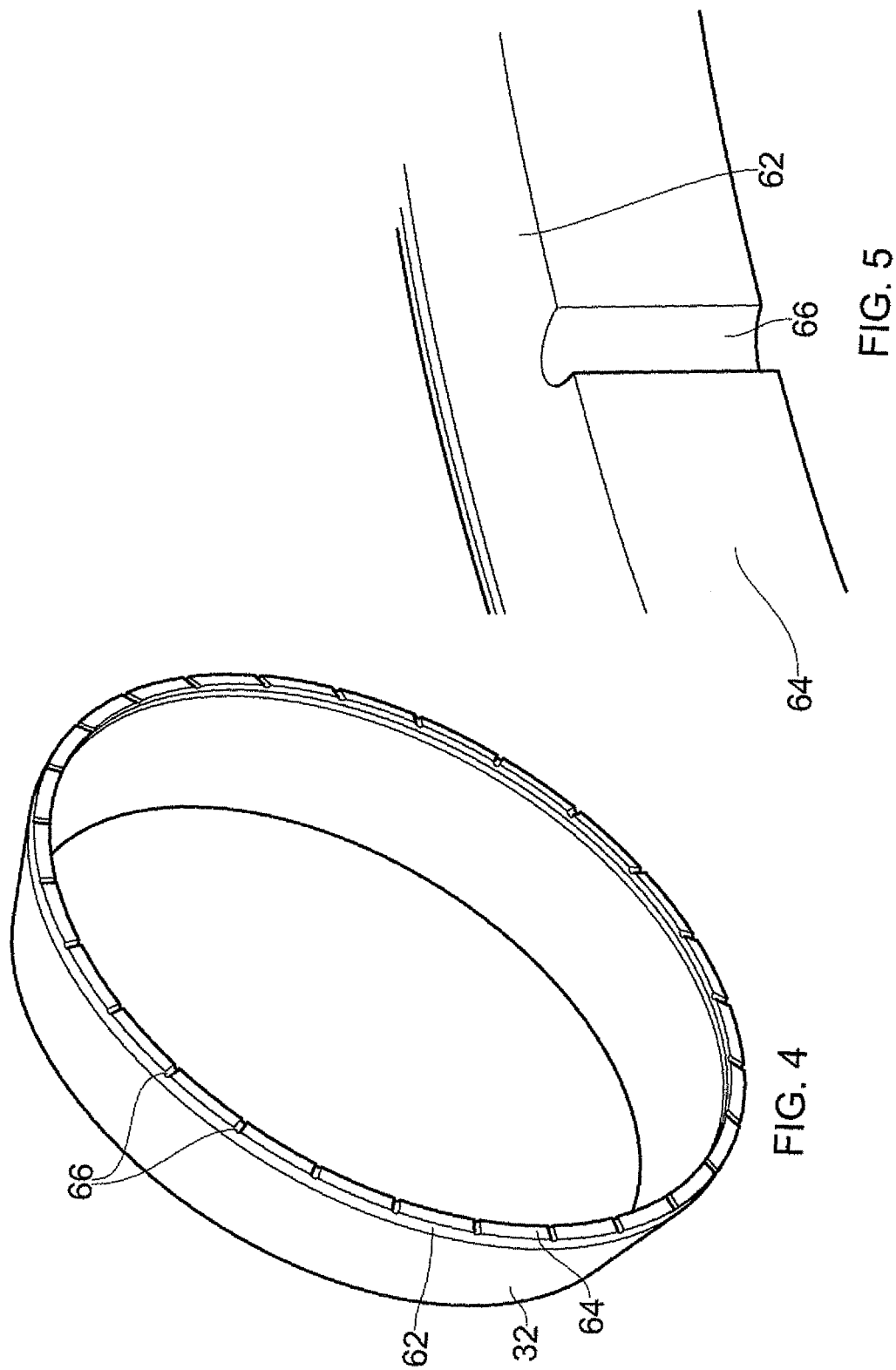

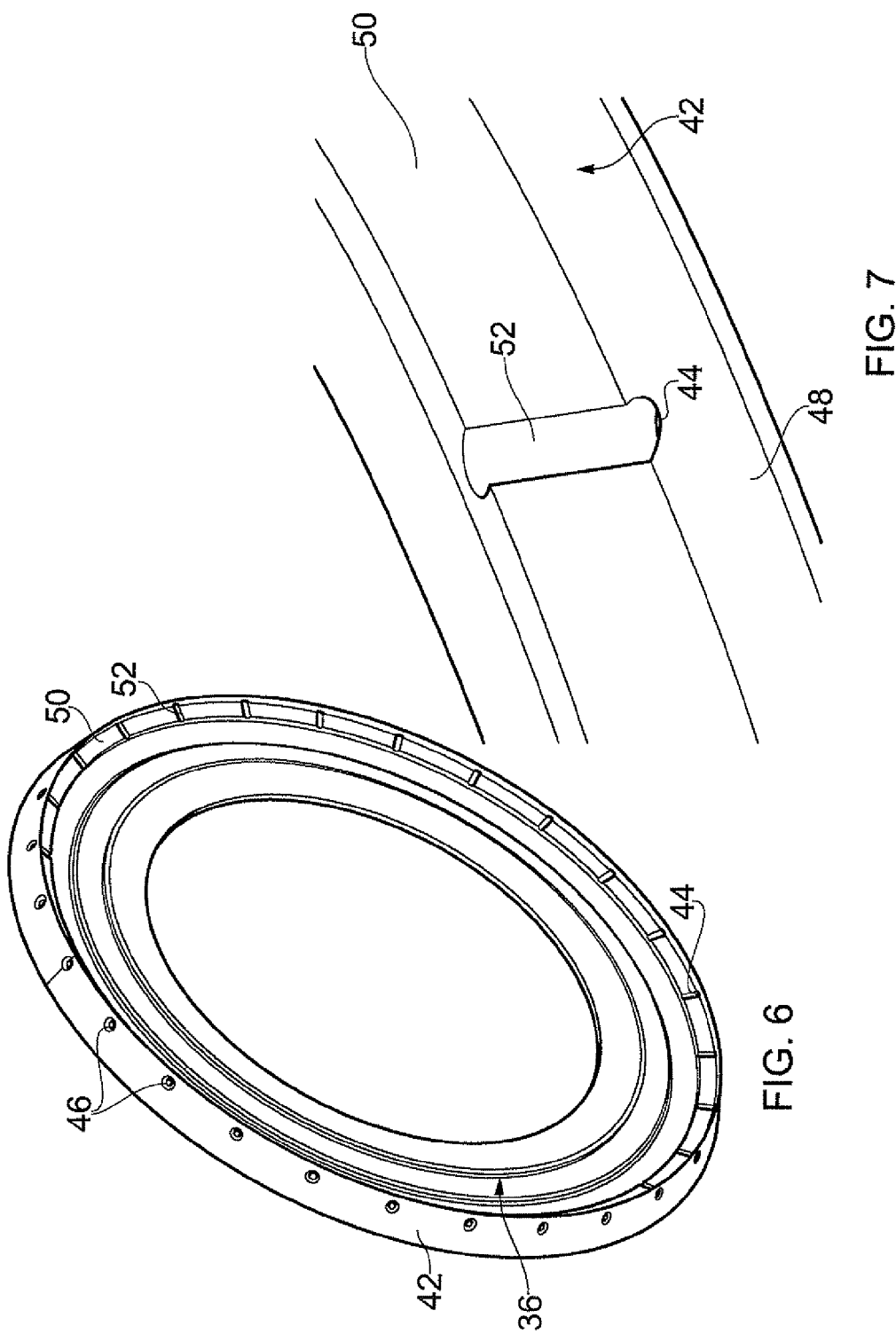

MOUNTING ARRANGEMENT

This invention concerns a mounting arrangement for a nose cone on a gas turbine engine, and also a gas turbine engine incorporating such a mounting arrangement.

A number of arrangements have been used for mounting nose cones on gas turbine engines. Such nose cones are typically made of composite material, and should preferably be resistant to bird strikes or other incidents. In the event of such an incident causing damage, this should not if possible cause metal pieces or components to be drawn into the engine causing potential damage thereto.

One such mounting arrangement includes a plurality of flexible brackets extending from a nose cone support ring, with radial bolts extending through holes in the nose cone and engaging with the flexible brackets. This arrangement does not however directly clamp the nose cone to the support ring. Further, the inclusion of holes in the nose cone provides stress concentration features which can for instance compromise the impact performance of the nose cone.

A further arrangement includes radially inclined bolts extending through an enlarged thickness section at the rear of the nose cone, the bolts being engageable with the nose cone support ring. The counterbores for these bolts present an undesirable aerodynamic interruption which will impact performance. Also the nose cone requires additional material at the rear end to receive the bolts, which adds to weight and can present manufacturing difficulties, particularly if the nose cone is produced as a filament wound composite construction.

According to the present invention there is provided an arrangement for mounting a nose cone on a gas turbine engine, the arrangement including a plurality of tightenable fastening members, each fastening member having an engagement member with a pair of opposed contact faces movably mounted on opposite sides of an elongate member, with at least one of the contact faces inclined relative to the elongate member, a plurality of first formations on the rear of the nose cone circumferentially spaced therearound, a plurality of second formations on a mounting member connected to the fan disc, the second formations being circumferentially spaced in a corresponding manner to the first formations, the first and second formations being configured to define a passage between the respective first and second formations when the nose cone is aligned relative to the mounting member with the elongate member of a respective fastening member extending through each said passage, at least one of the nose cone and mounting member having an inclined contact surface adjacent the respective first and second formations, the fastening members and contact surfaces being configured such that as the fastening members are tightened, engagement between the engagement member and the contact surfaces causes the nose cone to be urged axially towards the mounting member.

The fastening member engagement member may have a pair of inclined contact faces, which may be inclined substantially symmetrically about the elongate member.

Both the nose cone and mounting member may have inclined contact surfaces adjacent the respective first and second formations.

Each fastening member may include a bolt which extends through the engagement member, with the engagement member being movable along the bolt by threadable engagement.

Each bolt may extend generally radially and substantially perpendicular to the circumference of the nose cone.

The mounting member may include a plurality of holes each substantially coaxial with a respective passage defined by the first and second formations, so that the holes each receive a part of the respective fastening means. The holes may be radially outwards of the first and second formations, and may be configured to permit access to enable tightening of the fastening means.

The nose cone may have an inwardly turned rear end. A circumferentially outer part of the rear end may define an inclined engagement face, which face is engageable with a corresponding inclined engagement face on the mounting member, with the mounting member engagement face overlying the engagement face of the nose cone.

The contact surface of the nose cone may be provided on an inner lip of the nose cone rear end.

The arrangement may be configured to prevent loosening of the engagement members of the fastening members beyond a predetermined amount.

The first and second formations may be in the form of recesses, which recesses may be substantially semi-circular in cross section.

The invention also provides a gas turbine engine, the engine including an arrangement for mounting the nose cone, the arrangement being according to any of the preceding ten paragraphs.

An embodiment of the present invention will now be described by way of example only and with reference to the accompanying drawings, in which:

FIG. 4 is a perspective view from the rear of a nose cone of FIG. 3;

FIG. 5 is an enlarged part of FIG. 4;

FIG. 6 is a perspective view from the front of a nose cone support ring of FIG. 3; and FIG. 7 is an enlarged part of FIG. 6.

Figure 1:
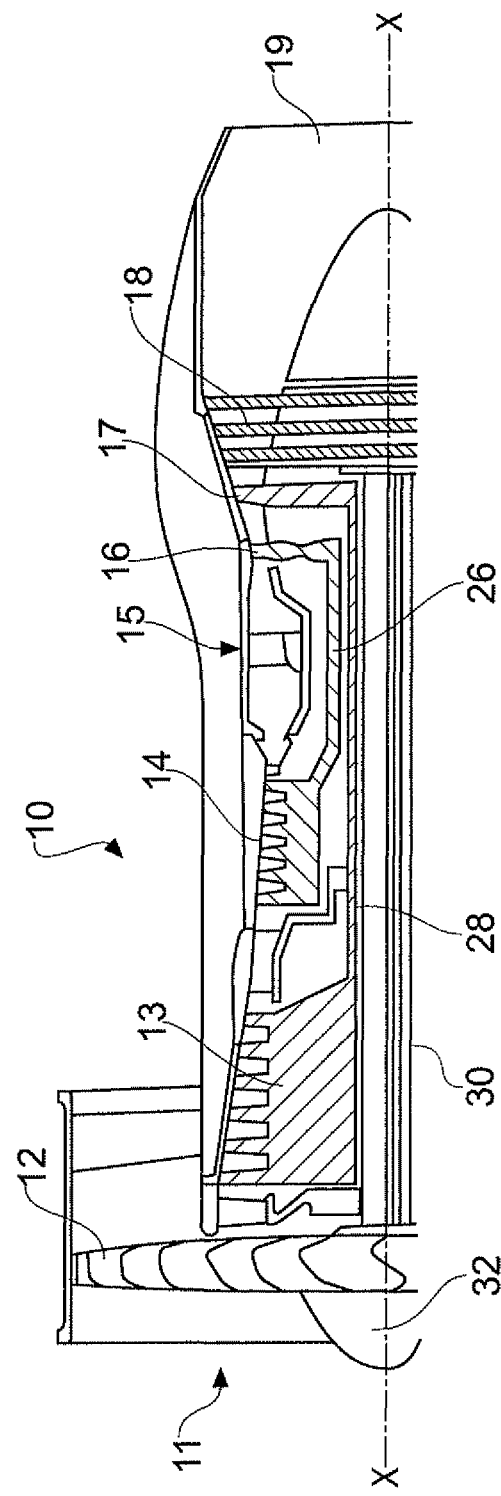
FIG. 1 is a diagrammatic cross sectional view through an upper half of a gas turbine engine according to the invention.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

A composite material nose cone 32 extends forwards of the fan 12. The nose cone 32 is mounted to a fan disc 34, which is not visible in FIG. 1 as it is concealed by the fan 12. The mounting of the nose cone 32 on the fan disc 34 is shown in more detail in FIG. 2.

Figure 3:
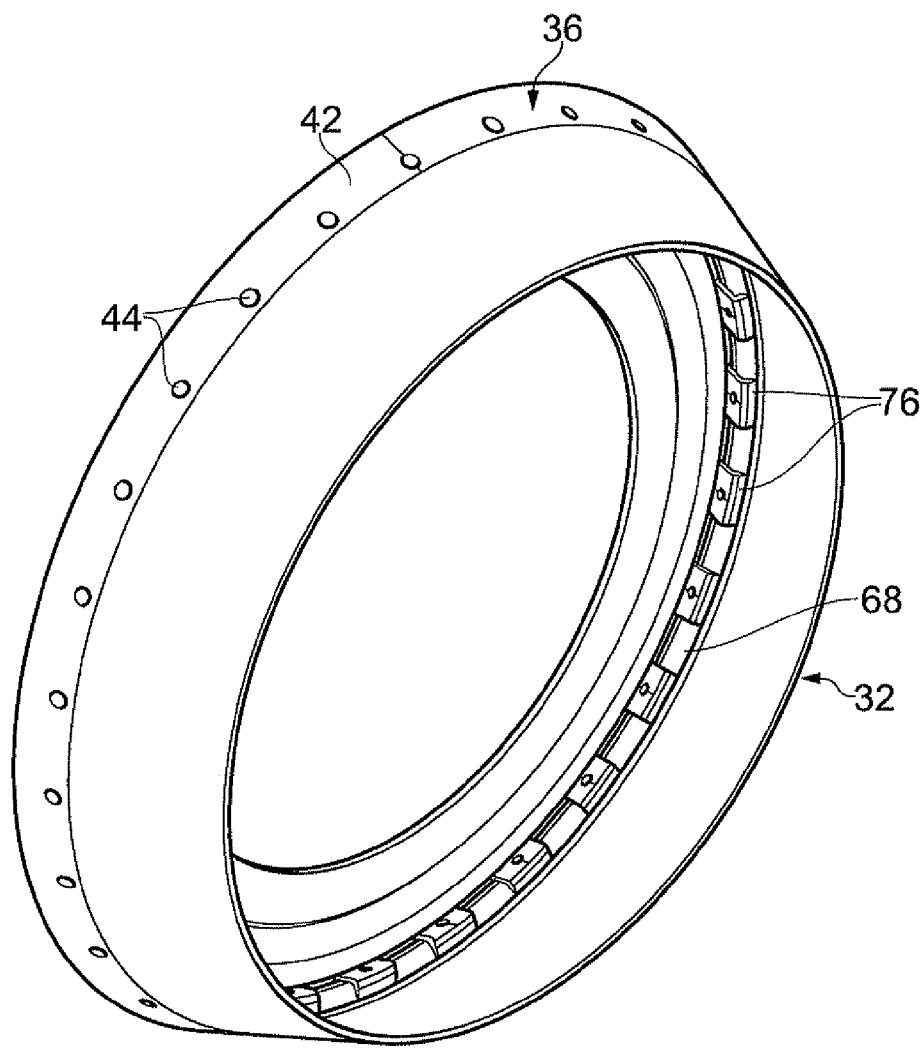
FIG. 3 is a perspective view from the front of the part of the engine of FIG. 2, but with some components removed.

A nose cone support ring 36 is mounted to a flange 38 on the front of the fan disc 34 by a plurality of bolts 40. The support ring 36 has an outer rim 42 which defines a parallel frusto-conical extension to the nose cone 32. A plurality of spaced radial openings 44 are provided through the rim 42 each having a countersunk opening 46. The radial openings 44 and countersunk openings 46 are shown in more detail in FIGS. 3, 6 and 7. The rim 42 converges towards the nose cone 32 and defines on its underside an engagement face 48.

Each opening 44 only extends through the rim 42, and moving radially inwardly a part 50 of the support ring defines a semi circular recess 52, coaxial with the opening 44. The rear of the part 50 defines an inclined contact surface 54, tapering radially inwardly. The part 50 is inclined relative to a generally radial web 56. The support ring 36 also mounts a fairing 58 which engages with the fan disc 34.

FIGS. 2 to 5 only shows a rear part of the nose cone 32. This rear part has an inwardly turned lip 60 which defines on its circumferential outer surface an engagement face 62 engageable against the engagement face 48 on the support ring 36. An inwardly turned flange 64 is provided at the rear end of the lip 60. A plurality of semi-circular recesses 66 are provided spaced around the lip 60 each corresponding in location to the semi-circular recesses 52. The recesses 66 correspond in size to the recesses 52, and when brought together define a circle of a similar size to the openings 44. The flange 64 tapers inwardly, and defines an inclined contact surface 68 on the outside of the recesses 62.

A fastening arrangement 70 is provided for each opening 44. The fastening arrangement comprises a bolt 72 with a countersunk head 74 with a shaped recess (not shown) therein to permit turning thereof by an appropriate tool. A Vee block 76 locates on the bolt 72, and a mounting nut 78 is provided mounted below the block 76. The block 76 has a hole through which the bolt 72 extends and two opposed and outwardly diverging contact faces 80.

Figure 2:
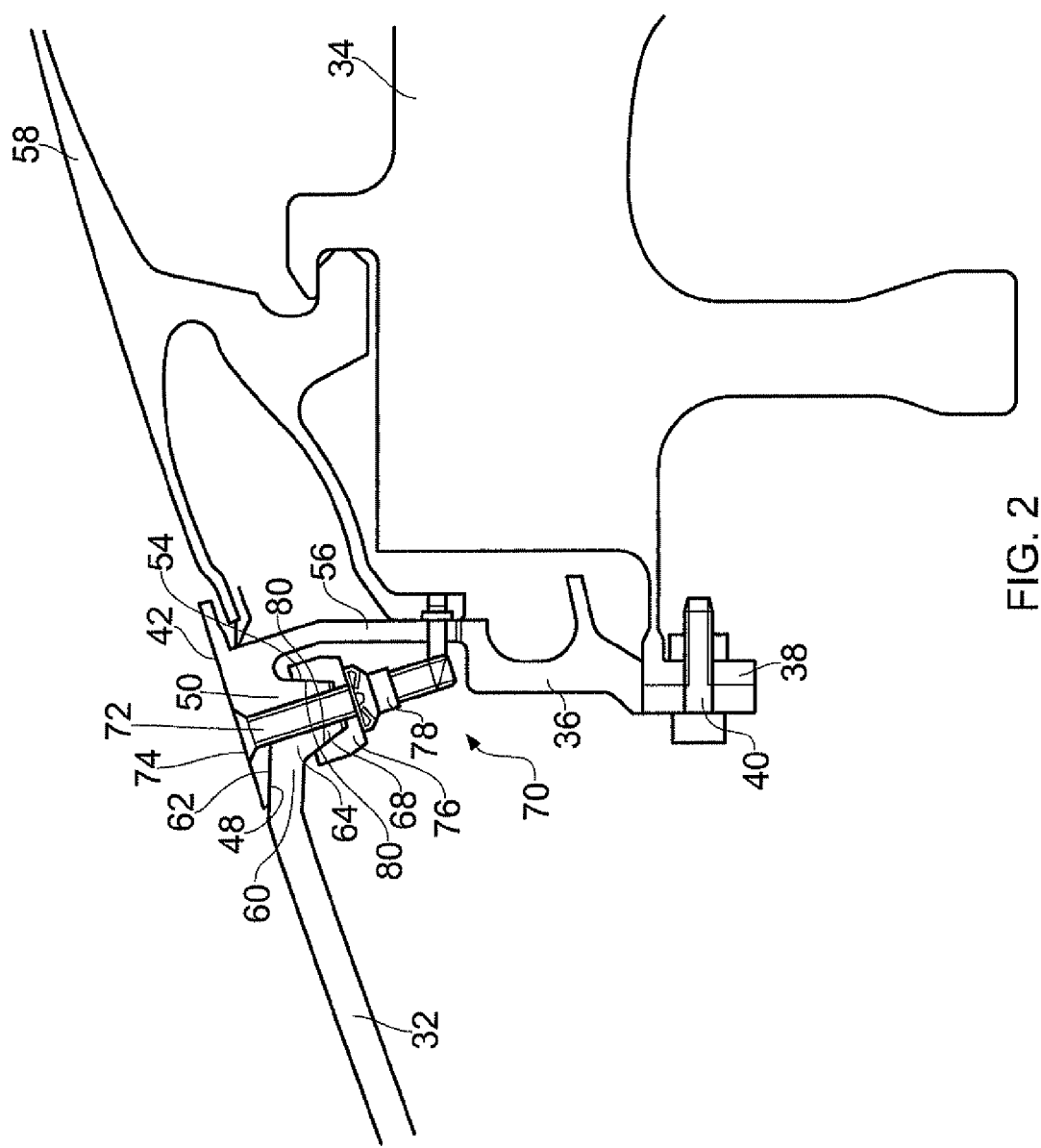
FIG. 2 is a diagrammatic cross sectional view through part of the engine of FIG. 1.

In use, a fastening arrangement 70 is provided for each opening 44, with the bolt head 74 located in the countersunk opening 46. The nut 78 will be loosened so that the Vee block 76 is spaced from the bolt head 74. As can be seen in FIG. 2, the location of the radial web 56 is such as to prevent the Vee block 76 passing inwardly beyond a predetermined point, and the radial web 56 also substantially prevents the Vee block 76 from rotating relative to the opening 44.

The nose cone 32 is then brought up against the support ring 36, with the semi-circular recesses 52, 66 aligned so as to locate around the bolts 72. Faces 62 and 64 engage with faces 48 and 50 respectively. Appropriate rotation of the bolts 72 will cause the nut 78 and hence Vee block 76 to move radially outwardly.

Engagement of the inclined contact surfaces 54 and 68 with the contact faces 80 on the Vee block 76 urges the nose cone 32 rearwardly as the bolts 72 are tightened, thereby mounting the nose cone 32 on the fan disc 34. When it is required to remove the nose cone 32, the bolts 72 can be loosened thereby releasing engagement of the Vee blocks 76 with the nose cone 32 to permit removal thereof. It is to be noted that the fastening arrangements 70 will be retained in position ready for replacement of the nose cone 32, and will be prevented from excessive loosening by engagement of the Vee blocks 76 against the radial web 56.

There is thus described a mounting arrangement for a nose cone which provides for a number of advantageous features. No holes are provided in the nose cone 32, thereby avoiding stress concentration features. The nose cone is of generally constant thickness thereby permitting filament winding if produced as a composite. The clamping loads are direct between the Vee block and the nose cone and support ring.

There is a spreading of clamping loads by virtue of the relatively large respective contact surfaces engaging between the Vee blocks and the nose cone and support ring, and particularly the respective engagement faces on the nose cone and support ring. This arrangement provides an aerodynamically smooth external surface. When the nose cone is removed, there are no loose parts, as the fastening arrangements will be retained on the support ring.

In the event of damage to the nose cone, for instance caused by a bird strike, only parts of the composite cone are likely to enter the engine, with the fastening arrangements being retained on the support ring. The clamping loads will increase by virtue of centrifugal forces during engine operation, thereby providing for securer clamping of the nose cone.

Various modifications may be made without departing from the scope of the invention. For instance different fastening arrangements could be used. Rather than separate fastening arrangements a single expanding or contracting band could be used. Rather than providing tightening using a thread, a sprung arrangement could be used sufficient to retain the nose cone in place under static conditions, and centrifugal forces will retain the nose cone firmly in place during use. Whilst the above example is usable with a composite nose cone, it is to be realised that the invention is equally applicable to nose cones made of different materials.

The invention claimed is:

1. An arrangement for mounting a nose cone on a gas turbine engine, the arrangement including a plurality of tightenable fastening members, each fastening member having an engagement member with a pair of opposed contact faces movably mounted on opposite sides of an elongate member, with at least one of the contact faces inclined relative to the elongate member, a plurality of first formations on the rear of the nose cone circumferentially spaced therearound, a plurality of second formations on a mounting member connected to the fan disc, the second formations being circumferentially spaced in a corresponding manner to the first formations, the first and second formations being configured to define a passage between the respective first and second formations when the nose cone is aligned relative to the mounting member with the elongate member of a respective fastening member extending through each said passage, at least one of the nose cone and mounting member having an inclined contact surface adjacent the respective first and second formations, the fastening members and contact surfaces being configured such that as the fastening members are tightened, engagement between the engagement member and the contact surfaces causes the nose cone to be urged axially towards the mounting member.

2. An arrangement according to claim 1, characterised in that the fastening member engagement member has a pair of inclined contact faces.

3. An arrangement according to claim 2, characterised in that the contact faces are inclined substantially symmetrically about the elongate member.

4. An arrangement according to claim 1, characterised in that both the nose cone and mounting member have inclined contact surfaces adjacent the respective first and second formations.

5. An arrangement according to claim 1, characterised in that each fastening member includes a bolt which extends through the engagement member, with the engagement member being movable along the bolt by threadable engagement.

6. An arrangement according to claim 5, characterised in that each bolt extends generally radially and substantially perpendicular to the circumference of the nose cone.

7. An arrangement according to claim 1, characterised in that the mounting member includes a plurality of holes each substantially coaxial with a respective passage defined by the first and second formations, so that the holes each receive a part of the respective fastening means.

8. An arrangement according to claim 7, characterised in that the holes are radially outwards of the first and second formations, and are configured to permit access to enable tightening of the fastening means.

9. An arrangement according to claim 1, characterised in that the nose cone has an inwardly turned rear end.

10. An arrangement according to claim 9, characterised in that a circumferentially outer part of the rear end defines an inclined engagement face, which face is engageable with a corresponding inclined engagement face on the mounting member, with the mounting member engagement face overlying the engagement face of the nose cone.

11. An arrangement according to claim 1, characterised in that the contact surface of the nose cone is provided on an inner lip of the nose cone rear end.

12. An arrangement according to claim 1, characterised in that the arrangement is configured to prevent loosening of the engagement members of the fastening members beyond a predetermined amount.

13. An arrangement according to claim 1, characterised in that the first and second formations are in the form of recesses.

14. An arrangement according to claim 13, characterised in that the recesses are substantially semi-circular in cross section.

15. A gas turbine engine, the engine including an arrangement for mounting the nose cone, characterised in that the arrangement is according to claim 1.

* * * * *